US012803079B2

(12) United States Patent
Yoo et al.

(10) Patent No.: US 12,803,079 B2
(45) Date of Patent: Nov. 17, 2026

(54) BATTERY MODULE INCLUDING COOLING MEMBER, AND BATTERY PACK AND ENERGY STORAGE SYSTEM INCLUDING THE SAME

(71) Applicant: LG ENERGY SOLUTION, LTD., Seoul (KR)

(72) Inventors: Jae-Min Yoo, Daejeon (KR); Jeong-O Mun, Daejeon (KR); Eun-Gyu Shin, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 19/008,066

(22) Filed: Jan. 2, 2025

(65) Prior Publication Data

US 2025/0140973 A1 May 1, 2025

Related U.S. Application Data

(63) Continuation of application No. 18/920,394, filed on Oct. 18, 2024, which is a continuation of application
(Continued)

(30) Foreign Application Priority Data

Jun. 17, 2019 (KR) ........................ 10-2019-0071732

(51) Int. Cl.
*H01M 10/6557* (2014.01)
*H01M 10/613* (2014.01)
(Continued)

(52) U.S. Cl.
CPC ..... *H01M 10/6557* (2015.04); *H01M 10/613* (2015.04); *H01M 10/625* (2015.04);
(Continued)

(58) Field of Classification Search
CPC ........... H01M 10/6557; H01M 10/613; H01M 10/6568; H01M 50/505; H01M 50/325
See application file for complete search history.

(56) References Cited

U.S. PATENT DOCUMENTS

| | | | | |
|---|---|---|---|---|
| 9,484,558 B2 | 11/2016 | Baek et al. | | |
| 2002/0102454 A1* | 8/2002 | Zhou | H01M 50/209 | 429/88 |

(Continued)

FOREIGN PATENT DOCUMENTS

| | | | |
|---|---|---|---|
| CN | 106611827 A | 5/2017 | |
| CN | 107528103 A * | 12/2017 | H01M 10/6569 |

(Continued)

OTHER PUBLICATIONS

Machine Translation of WO-2017124875-A1 (May 30, 2025) (Year: 2025).*

(Continued)

*Primary Examiner* — Matthew J Merkling
(74) *Attorney, Agent, or Firm* — Birch, Stewart, Kolasch & Birch, LLP

(57) ABSTRACT

A battery module reduces the risk of secondary ignition or explosion and increases durability against external impacts. The battery module includes a plurality of secondary batteries respectively having a gas venting portion for discharging a gas generated therein to the outside at a predetermined pressure and arranged in a front and rear direction in two rows; and a cooling member including a body portion interposed between two rows of the plurality of secondary batteries and having a size corresponding to left and right sides of the plurality of secondary batteries, and a gas discharge portion provided to at least one of an upper portion
(Continued)

and a lower portion of the body portion and having a gas discharge passage elongated from a front end to a rear end of the body portion.

10 Claims, 8 Drawing Sheets

Related U.S. Application Data

No. 18/639,727, filed on Apr. 18, 2024, now Pat. No. 12,155,052, which is a continuation of application No. 17/267,948, filed as application No. PCT/KR2020/006861 on May 27, 2020, now Pat. No. 12,002,939.

(51) Int. Cl.

| | |
|---|---|
| ***H01M 10/625*** | (2014.01) |
| ***H01M 10/6568*** | (2014.01) |
| ***H01M 50/325*** | (2021.01) |
| ***H01M 50/35*** | (2021.01) |
| ***H01M 50/505*** | (2021.01) |
| ***H01M 50/507*** | (2021.01) |

(52) U.S. Cl.

CPC ..... *H01M 10/6568* (2015.04); *H01M 50/325* (2021.01); *H01M 50/35* (2021.01); *H01M 50/505* (2021.01); *H01M 50/507* (2021.01); *H01M 2220/20* (2013.01)

(56) References Cited

U.S. PATENT DOCUMENTS

| | | | | |
|---|---|---|---|---|
| 2007/0031728 | A1* | 2/2007 | Lee | H01M 10/6566 429/120 |
| 2009/0142650 | A1 | 6/2009 | Okada et al. | |
| 2010/0279152 | A1* | 11/2010 | Payne | H01M 50/211 429/50 |
| 2011/0189521 | A1 | 8/2011 | Lee et al. | |
| 2012/0028099 | A1* | 2/2012 | Aoki | H01M 10/643 429/120 |
| 2012/0328918 | A1 | 12/2012 | Kim | |
| 2015/0162578 | A1 | 6/2015 | Kim et al. | |
| 2015/0372355 | A1 | 12/2015 | McLaughlin et al. | |
| 2016/0126531 | A1 | 5/2016 | Kim et al. | |
| 2018/0175466 | A1 | 6/2018 | Seo et al. | |
| 2019/0044200 | A1 | 2/2019 | Motoyoshi et al. | |
| 2019/0198951 | A1 | 6/2019 | Tong et al. | |
| 2019/0267682 | A1 | 8/2019 | Seo et al. | |
| 2019/0273232 | A1 | 9/2019 | Fu et al. | |
| 2020/0058973 | A1 | 2/2020 | Golubkov | |
| 2020/0062130 | A1 | 2/2020 | Wuensche et al. | |
| 2020/0212525 | A1 | 7/2020 | Ogino et al. | |
| 2021/0218087 | A1 | 7/2021 | Yoo et al. | |

FOREIGN PATENT DOCUMENTS

| | | | |
|---|---|---|---|
| CN | 108075062 | A | 5/2018 |
| CN | 108701790 | A | 10/2018 |
| CN | 212461955 | U | 2/2021 |
| EP | 2 546 904 | A1 | 1/2013 |
| JP | 2002-134078 | A | 5/2002 |
| JP | 5183171 | B2 | 4/2013 |
| JP | 2017-157407 | A | 9/2017 |
| KR | 10-0776767 | B1 | 11/2007 |
| KR | 10-2012-0076756 | A | 7/2012 |
| KR | 10-2013-0033597 | A | 4/2013 |
| KR | 10-2015-0066077 | A | 6/2015 |
| KR | 10-2015-0142338 | A | 12/2015 |
| KR | 10-1669115 | B1 | 10/2016 |
| KR | 10-2018-0050206 | A | 5/2018 |
| KR | 10-2018-0112617 | A | 10/2018 |
| WO | WO 2017/033412 | A1 | 3/2017 |
| WO | WO-2017124875 | A1 * | 7/2017 |
| WO | WO 2018/105957 | A1 | 6/2018 |
| WO | WO 2019/026676 | A1 | 2/2019 |
| WO | WO 2019/028516 | A1 | 2/2019 |

OTHER PUBLICATIONS

Machine Translation of CN107528103A (Feb. 25, 2026) (Year: 2026).*

Extended European Search Report for European Application No. 20827285.6, dated Jan. 26, 2022.

International Search Report for PCT/KR2020/006861 mailed on Sep. 16, 2020.

European Office Action for European Application No. 23 170 193.9, dated Feb. 3, 2025.

* cited by examiner

BATTERY MODULE INCLUDING COOLING MEMBER, AND BATTERY PACK AND ENERGY STORAGE SYSTEM INCLUDING THE SAME

CROSS-REFERENCE TO RELATED APPLICATIONS

This application is a Continuation of application Ser. No. 18/920,394 filed on Oct. 18, 2024, which is a Continuation of application Ser. No. 18/639,727 filed on Apr. 18, 2024 (now U.S. Pat. No. 12,155,052 issued Nov. 26, 2024), which is a Continuation of application Ser. No. 17/267,948 filed on Feb. 11, 2021 (now U.S. Pat. No. 12,002,939 issued on Jun. 4, 2024), which is a National Phase of PCT International Application No. PCT/KR2020/006861, filed on May 27, 2020, which claims priority under 35 U.S.C. § 119(a) to Patent Application No. 10-2019-0071732, filed in the Republic of Korea on Jun. 17, 2019. All of the above applications are hereby expressly incorporated by reference into the present application.

TECHNICAL FIELD

The present disclosure relates to a battery module including a cooling member, and a battery pack and an energy storage system including the battery module, and more particularly, to a battery module that reduces the risk of secondary ignition or explosion and increases durability against external impacts.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery exterior, hermetically containing the electrode assembly together with an electrolyte.

In recent years, secondary batteries have been widely used not only in small-sized devices such as portable electronic devices but also in medium-sized or large-sized devices such as vehicles and power storage devices. When the secondary batteries are used in the middle-sized or large-sized devices, a large number of secondary batteries are electrically connected to increase capacity and power. In particular, secondary batteries are widely used for the middle-sized or large-sized devices since they may be easily stacked.

Meanwhile, recently, as the need for a large-capacity structure increases along with the utilization as an energy storage source, the demand for a plurality of secondary batteries connected in series and/or in parallel, a battery module accommodating the secondary batteries, and a battery pack having a battery management system (BMS) increases.

In addition, in order to protect a plurality of secondary batteries from external impacts or store the plurality of secondary batteries, the battery pack generally includes an outer housing made of metal. Meanwhile, the demand for a high-capacity battery pack has recently increased. However, the high-capacity battery pack requires enhanced mechanical rigidity for protection against external impacts since the battery module has increased size and weight.

Moreover, since the high-capacity battery pack generates more heat during charging and discharging, it is necessary to apply an effective cooling method.

In addition, if one secondary battery is ignited among the plurality of secondary batteries accommodated in the battery module, the gas heat or flame may be easily transferred to neighboring secondary batteries to cause secondary explosion or ignition of other secondary batteries.

DISCLOSURE

Technical Problem

The present disclosure is designed to solve the problems of the related art, and therefore the present disclosure is directed to providing a battery module that reduces the risk of secondary ignition or explosion and increases durability against external impacts.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a plurality of secondary batteries, each secondary battery of the plurality of secondary batteries having a gas venting portion for discharging a gas generated therein to the outside at a predetermined pressure and the plurality of secondary batteries arranged in a front and rear direction in two rows; and a cooling member including a body portion interposed between the two rows of the plurality of secondary batteries and having a size corresponding to left and right sides of the plurality of secondary batteries, and a gas discharge portion provided to at least one of an upper portion and a lower portion of the body portion and having a gas discharge passage elongated from a front end to a rear end of the body portion.

Also, the battery module may further comprise a tray including a support portion extending in a horizontal direction so that the plurality of secondary batteries are mounted to an upper surface of the support portion, and side portions extending upward from a left end and a right end of the support portion; a bus bar assembly including a bus bar configured to electrically connect the plurality of secondary batteries, and a bus bar housing coupled to a side portion of the tray in a state where the bus bar is mounted thereto; an upper plate coupled to the bus bar housing and configured to cover an upper portion of the plurality of secondary batteries; a front cover coupled to a front end of the support portion and configured to cover a foremost side of the plurality of secondary batteries; and a rear cover coupled to a rear end of the support portion and configured to cover a rearmost side of the plurality of secondary batteries.

Moreover, a front end of the cooling member may be coupled to the front cover, a rear end of the cooling member may be coupled to the rear cover, and a lower end of the cooling member may be coupled to the support portion of the tray.

In addition, an insert opening indented inward may be formed at a portion of each of the front cover and the rear cover so that a portion of each of the front end and the rear end of the cooling member is inserted respectively therein.

Further, a coolant injection port and a coolant discharge port may be provided to the front end and the rear end of the cooling member, respectively.

Also, a fixing groove elongated from the front end to the rear end of the body portion may be provided to a lower portion of the cooling member.

Moreover, a guide protrusion elongated in the front and rear direction and protruding upward so as to be partially inserted into the fixing groove of the cooling member may be provided to the support portion of the tray.

In addition, a coupling portion having a protruding structure to be inserted into the fixing groove may be provided to an insert opening formed at each of the front cover and the rear cover.

Further, a coolant injection port may be provided to an upper center of the cooling member, and a coolant discharge port may be provided to each of the front end and the rear end of the body portion.

Also, a coolant channel configured to allow a coolant injected into the coolant injection port to move in the front and rear direction may be formed inside the cooling member.

Moreover, beading portions raised in a left and right direction may be provided to outer sides of the cooling member in the left and right direction.

In another aspect of the present disclosure, there is also provided a battery pack, comprising at least one battery module according to the present disclosure.

In further another aspect of the present disclosure, there is also provided an energy storage system, comprising the battery pack according to the present disclosure.

Advantageous Effects

According to an embodiment of the present disclosure, since the gas discharge portion provided to at least one of the upper portion and the lower portion of the body portion of the cooling member and having the gas discharge passage extending from the front end to the rear end of the body portion may rapidly discharge the gas discharged from the plurality of secondary batteries in the front and rear direction, it is possible to prevent secondary explosion and the like, thereby improving the safety of the battery module further.

Also, according to an embodiment of the present disclosure, since the cooling member is coupled to the front cover and the rear cover, the cooling member may be stably fixed. In addition, since the cooling member may serve as a central main shaft connecting the front cover and the rear cover, external shocks may be absorbed or defended through their coupled structure, thereby increasing the mechanical stiffness of the battery module and further improving the stability.

In addition, according to an embodiment of the present disclosure, the fixing groove of the cooling member may be fixed to the support portion of the tray by being coupled with the guide protrusion of the tray, thereby facilitating easily installation of the battery module. Moreover, since the cooling member may act as a main shaft against external impacts in the upper and lower direction by using the coupling structure with the tray, it is possible to increase the mechanical rigidity of the battery module further.

Further, according to an embodiment of the present disclosure, since the cooling member includes the coolant injection port provided at the center of the upper portion and the coolant discharge ports respectively provided at the front end and the rear end of the cooling member, it may be more effective to maintain a good thermal balance of two rows of the plurality of secondary batteries.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
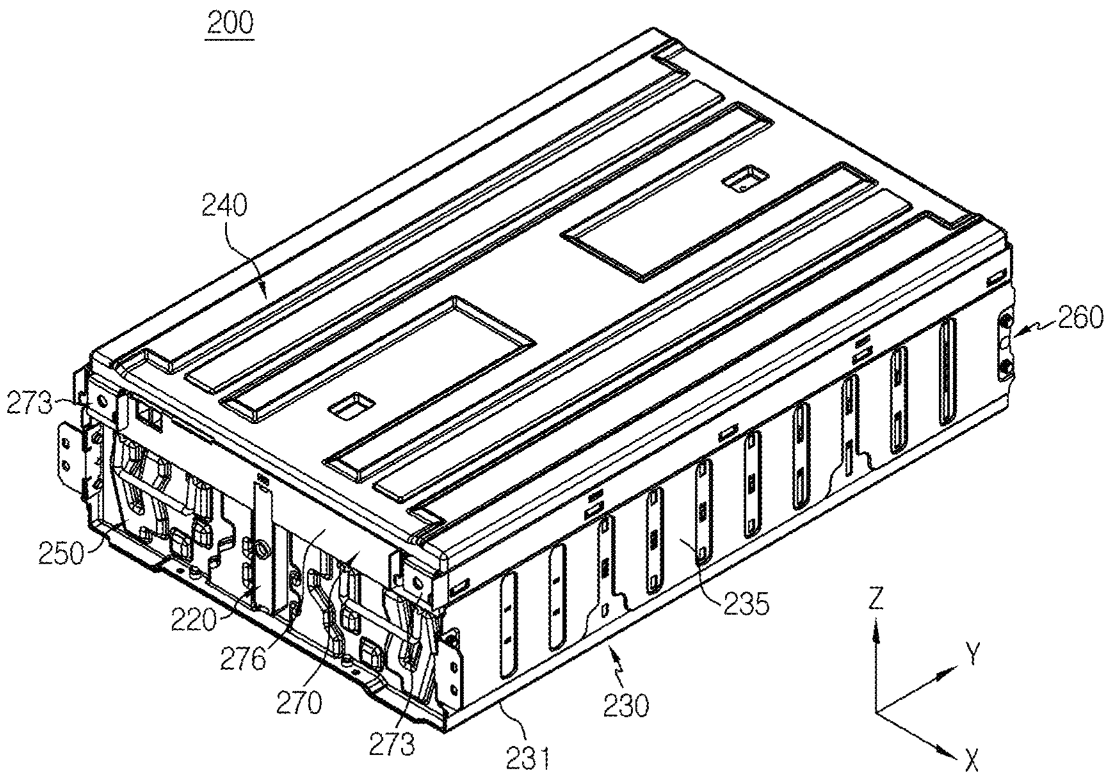
FIG. 1 is a perspective view schematically showing a battery module according to an embodiment of the present disclosure.

FIG. 1 is a perspective view schematically showing a battery module according to an embodiment of the present disclosure. Also, FIG. 2 is an exploded perspective view schematically showing components of the battery module according to an embodiment of the present disclosure.

Figure 2:
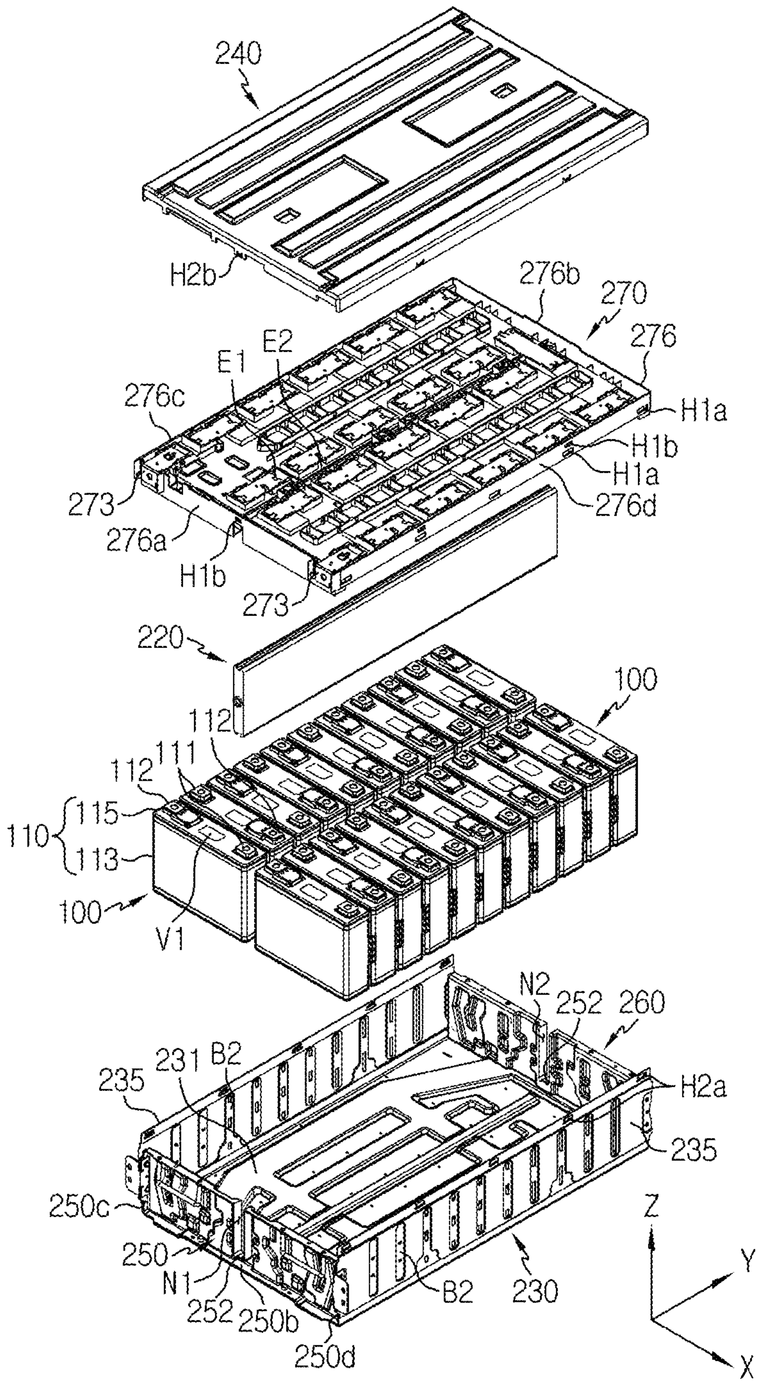
FIG. 2 is an exploded perspective view schematically showing components of the battery module according to an embodiment of the present disclosure.

Referring to FIGS. 1 and 2, a battery module 200 according to an embodiment of the present disclosure includes a plurality of secondary batteries 100 and a cooling member 220.

Here, the secondary battery 100 may include a battery case 110, and an electrode assembly (not shown) hermetically accommodated in the battery case 110 together with an electrolyte (not shown).

Specifically, the battery case 110 may be formed in a rectangular parallelepiped shape by plating or pressing a metal plate such as stainless steel. That is, the secondary battery 100 of this embodiment may be a can-type battery having a rectangular parallelepiped shape as a whole. In particular, the secondary battery may be a rectangular battery of a rectangular parallelepiped shape, whose length in a front and rear direction (a stacking direction, Y direction) is smaller than the length in a left and right direction based on a plane.

In addition, the battery case 110 include a rectangular case body 113 having an open top and made of a metal material, and a top cap 115 coupled to the open top of the case body 113 and having electrode terminals that include a positive electrode terminal 111 and a negative electrode terminal 112.

Moreover, the battery case 110 may have six surfaces in total, namely front, rear, upper, lower, left and right surfaces. At this time, the positive electrode terminal 111 and the negative electrode terminal 112 may be formed on the upper surface of the battery case 110 to protrude upward from the top cap 115. However, although the electrode terminals are shown as being located on the upper surface of the battery case 110 as in FIG. 2, the locations of the electrode terminals are not limited to the upper surface of the battery case 110. In other words, one electrode terminal may be formed at each of the upper surface and the lower surface of the battery case 110, or one electrode terminal may be formed at each of the upper surface and the left or right surface of the battery case 110.

For example, in order to manufacture the secondary battery 100, first, an electrode assembly (not shown) is inserted into the case body 113, the top cap 115 is placed on the open top of the case body 113, and then an adhesive surface of the top cap 115 may be sealed by laser welding. After that, an electrolyte may be injected into the battery case 110.

Here, the electrode assembly is in the form of a so-called jelly roll in which a negative electrode plate and a positive electrode plate coated with electrode active materials between which a separator is interposed are wound on a current collector having a sheet form made of a conductive metal or a conductive resin. At this time, an electrode tab may be provided to protrude at each end of the negative electrode plate and the positive electrode plate. For example, two electrode tabs having different polarities may be electrically connected to two electrode terminals by welding or soldering, respectively.

In addition, even though the electrode assembly is shown in the form of a jelly roll, it is not necessarily limited thereto. For example, the electrode assembly may be a stack type in which a plurality of negative electrode plates, a plurality of positive electrode plates and a separator interposed therebetween are stacked.

Further, the secondary battery 100 may include a gas venting portion V1 that discharges a gas generated therein to the outside at a predetermined pressure. For example, the gas venting portion V1 may be provided to a portion of the top cap 115. For example, the gas venting portion V1 may be formed at a central portion of the top cap 115. The gas venting portion V1 may be configured in such a way that a portion of the top cap 115 is formed to have a thin thickness.

For example, the thickness of the gas venting portion V1 may be 0.1 mm. The gas venting portion V1 may have a notch formed at a portion of the top cap 115. Thus, in the secondary battery 100 according to an embodiment of the present disclosure, when excessively gas is generated inside the battery case during charging and discharging, the gas venting portion V1 may be opened by internal pressure to discharge the gas to the outside.

Meanwhile, referring to FIGS. 1 and 2 again, the plurality of secondary batteries 100 may be arranged in two rows in the front and rear direction (Y direction). The plurality of secondary batteries 100 may be arranged such that two rows are spaced apart by a predetermined distance.

Specifically, among the plurality of secondary batteries 100 arranged in one row, one secondary battery 100 may be disposed such that the positive electrode terminal 111 is located at a right side and the negative electrode terminal 112 is located at a relatively left side. Another secondary battery positioned adjacent to the one secondary battery may be arranged such that the negative electrode terminal 112 is located at a right side and the positive electrode terminal 111 is located at a relatively left side. In this way, the plurality of secondary batteries 100 of one row may be alternately stacked.

For example, as shown in FIG. 2, the battery module 200 of the present disclosure may include 22 secondary batteries 100 arranged in two rows in the front and rear direction (Y direction). In each row, 11 secondary batteries 100 may be provided. The 11 secondary batteries 100 may be alternately stacked such that one secondary battery and another secondary battery 100 adjacent thereto have different left and right locations from each other.

Figure 3:
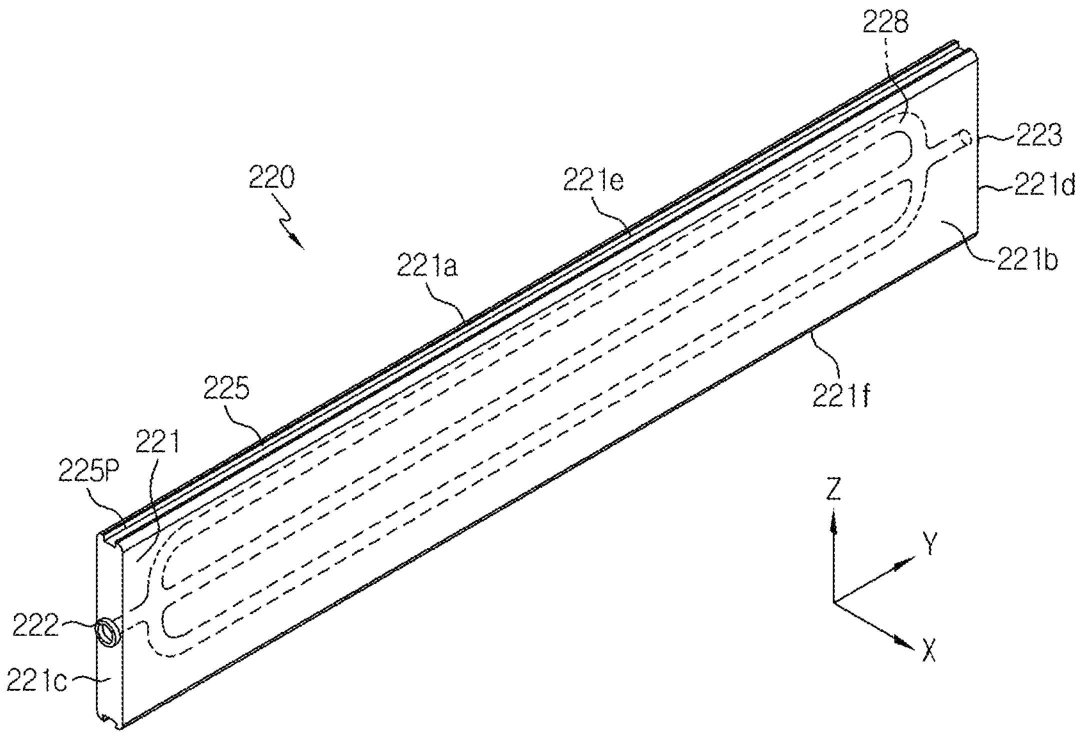
FIG. 3 is a perspective view schematically showing a cooling member, employed at the battery module according to an embodiment of the present disclosure.
Figure 4:
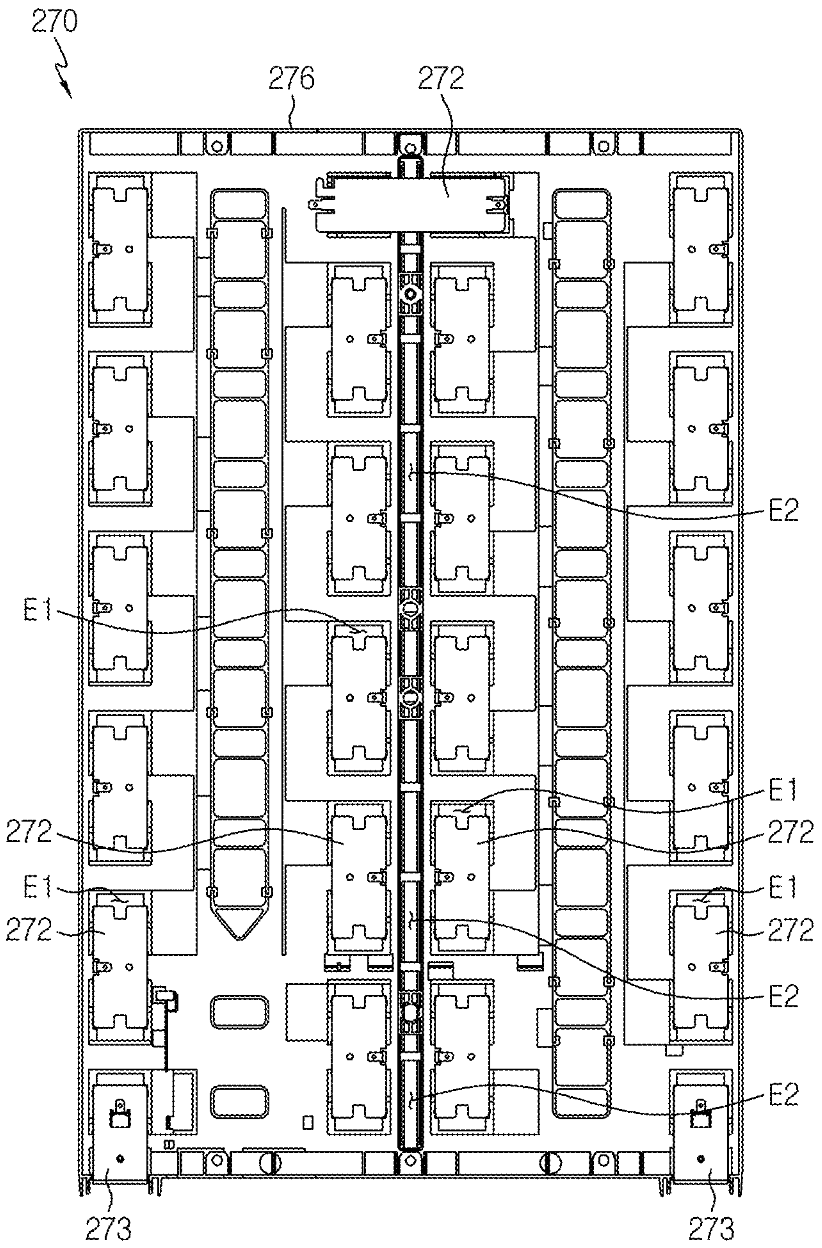
FIG. 4 is a plan view schematically showing a cooling member and a bus bar assembly, employed at the battery module according to an embodiment of the present disclosure.
Figure 5:
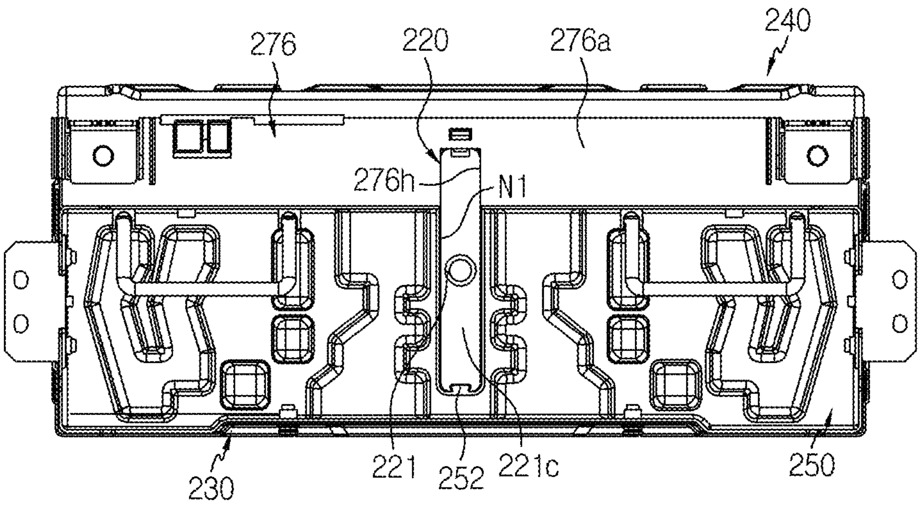
FIG. 5 is a front view schematically showing the battery module according to an embodiment of the present disclosure.
Figure 6:
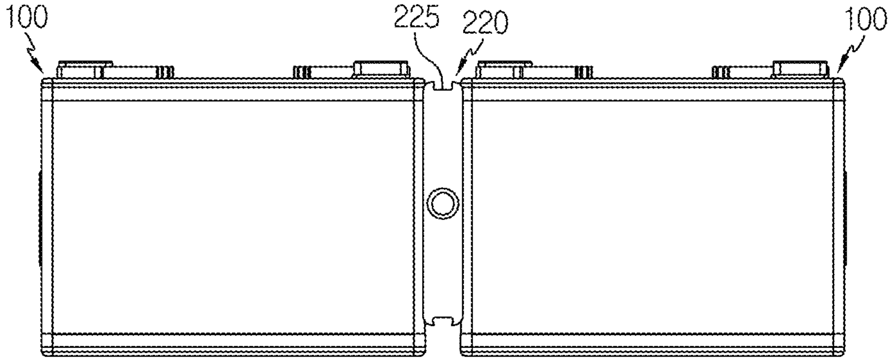
FIG. 6 is a front view schematically showing only some components of the battery module according to an embodiment of the present disclosure.

FIG. 3 is a perspective view schematically showing a cooling member, employed at the battery module according to an embodiment of the present disclosure. FIG. 4 is a plan view schematically showing a cooling member and a bus bar assembly, employed at the battery module according to an embodiment of the present disclosure. FIG. 5 is a front view schematically showing the battery module according to an embodiment of the present disclosure. Also, FIG. 6 is a front view schematically showing only some components of the battery module according to an embodiment of the present disclosure.

Referring to FIGS. 3 to 6 along with FIG. 2, the cooling member 220 of the present disclosure may generally include a body portion 221 and a gas discharge portion 225. Specifically, the body portion 221 may be inserted into a space formed between two rows of the plurality of secondary batteries 100. That is, the body portion 221 of the cooling member 220 may be positioned to be interposed between two rows of the plurality of secondary batteries 100. For example, the cooling member 220 may be a heatsink having a coolant injection port 222, a coolant discharge port 223 and a coolant channel 228 provided therein.

In addition, the body portion 221 may have a rectangular parallelepiped shape which has a relatively narrow width in the left and right direction and is elongated in the front and rear direction (Y direction) and the upper and lower direction (Z direction). The body portion 221 may have a size corresponding to the side of the plurality of secondary batteries 100 in the left and right direction (X direction). For example, the body portion 221 may have a size equal to or slightly smaller than the height of the left surface or the right surface of the plurality of secondary batteries 100 in the upper and lower direction. The length of the body portion 221 in the front and rear direction (Y direction) may be equal to or greater than the total length of the plurality of secondary batteries 100, which are arranged in two rows, in the front and rear direction (Y direction).

Moreover, both left and right surfaces 221*a*, 221*b* of the body portion 221 of the cooling member 220 may be formed to contact the plurality of secondary batteries 100. For example, as shown in FIG. 1, the body portion 221 of the cooling member 220 may be located to be interposed between 22 secondary batteries 100 arranged in two rows. The left surface of the body portion 221 may contact the right surface of 11 secondary batteries 100 arranged at the left side. The right surface of the body portion 221 may contact the left surface of 11 secondary batteries 100 arranged at the right side.

Thus, according to this configuration of the present disclosure, since the cooling member 220 is interposed between two rows of the plurality of secondary batteries 100 and includes the body portion 221 having a size corresponding to both left and right portions of the plurality of secondary batteries 100, it is possible to simultaneously cool the plurality of secondary batteries 100 arranged in two rows by using one cooling member 220, thereby reducing the manufacturing cost of the battery module. In addition, since the cooling member 220 of the present disclosure may cool two rows of the plurality of secondary batteries evenly without biasing heat to any one side, the thermal balance of the battery module 200 may be properly adjusted, thereby ensuring effectively cooling.

In addition, the gas discharge portion 225 may be provided to at least one of an upper portion 221*e* and a lower portion 221*f* of the body portion 221. A gas discharge passage 225P elongated from a front end 221*c* to a rear end 221*d* of the body portion 221 may be formed at the gas discharge portion 225. For example, as in FIG. 1, the gas discharge portion 225 may be located at the upper portion of the body portion 221, and the gas discharge passage 225P may be have a groove shape extending from the front end 221*c* to the rear end 221*d* of the upper portion 221*e* of the cooling member 220 and indented inward.

That is, the gas discharge portion 225 may move the gas discharged from the plurality of secondary batteries 100 to the front or rear side of the battery module 200 through the gas discharge passage 225P and discharge the gas to the outside.

Thus, according to this configuration of the present disclosure, since the gas discharge portion 225 provided to at least one of the upper portion 221*e* and the lower portion 221*f* of the body portion 221 of the cooling member 220 and having the gas discharge passage 225P extending from the front end 221*c* to the rear end 221*d* of the body portion 221 may rapidly discharge the gas generated from the plurality of secondary batteries 100 in the front and rear direction, it is possible to prevent secondary explosion and the like, thereby improving the safety of the battery module 200 further.

Referring to FIG. 2 again, the battery module 200 according to an embodiment of the present disclosure may further include a tray 230, an upper plate 240, a bus bar assembly 270, a front cover 250, and a rear cover 260.

Specifically, the tray 230 may generally include a support portion 231 and a side portion 235. More specifically, the support portion 231 may be configured such that the plurality of secondary batteries 100 are mounted to an upper surface thereof. For example, the support portion 231 may have a plate shape extending in a horizontal direction. That is, as shown in FIG. 2, the support portion 231 have a form extending in the horizontal direction and have a size corresponding to the size of the plurality of secondary batteries 100 in the front and rear direction and in the left and right direction such that two rows of the plurality of secondary batteries 100 are mounted to the upper surface thereof. For example, the tray 230 may be made of an insulating material, steel or stainless steel.

In addition, the side portion 235 may be configured to cover the left and right sides of the plurality of secondary batteries 100. For example, the side portion 235 may be bent to extend upward from the left and right ends of the support portion 231. That is, as shown in FIG. 2, the tray 230 may have two side portions 235 bent to extend upward from both left and right ends of the support portion 231, respectively.

Further, the side portion 235 may have a beading portion B2 provided to a part thereof to raise in the left and right direction (an inner direction toward the secondary battery). The beading portion B2 may be formed in plural at locations corresponding to the left sides or the right sides of the plurality of secondary batteries 100, respectively. For example, as shown in FIG. 2, 10 beading portions B2 raised inward may be formed at one side portion 235.

Thus, according to this configuration of the present disclosure, since the tray 230 has a structure capable of stably protecting the plurality of secondary batteries 100 against external impacts, it is possible to increase the safety of the battery module 200 against external impacts.

Referring to FIG. 4 along with FIGS. 1 and 2, the bus bar assembly 270 may include a bus bar 272, a terminal bus bar 273, and a bus bar housing 276.

Specifically, the bus bar 272 may include a conductive metal, for example copper, aluminum, nickel, or the like. The bus bar 272 may be configured to electrically connect the plurality of secondary batteries 100 to each other. For example, as shown in FIG. 2, the bus bar 272 may have a plate shape extending in a horizontal direction. The bus bar 272 may contact and connect the negative electrode terminal 112 of one secondary battery 100 and the positive electrode terminal 111 of another secondary battery 100.

In addition, the terminal bus bar 273 may be provided at an end of an electrical connection structure of the plurality of secondary batteries 100. That is, the terminal bus bar 273 may be electrically connected to the electrode terminal of a secondary battery 100 that is located at the end of the electrical connection structure of the plurality of secondary batteries 100. The terminal bus bar 273 may be, for example, copper, aluminum alloy, nickel alloy, or the like.

Moreover, the bus bar housing 276 may be configured such that a plurality of bus bars 272 are mounted thereto. A plurality of openings E1 opened to respectively communicate with the plurality of secondary batteries 100 may be formed in the bus bar housing 276. Thus, the bus bar 272 may contact the electrode terminals of the plurality of secondary batteries 100 through the openings E1 of the bus bar housing 276. The bus bar housing 276 may have an electrically insulating material, and, for example, the bus bar housing 276 may have a plastic material. More specifically, the plastic material may be polyvinyl chloride.

In addition, the bus bar housing 276 may have an open portion E2 opened in a part thereof to communicate with the gas discharge passage 225P of the gas discharge portion 225 of the cooling member 220. The gas introduced through the opening E1 of the bus bar housing 276 may move through the open portion E2, and the moved gas is collected in the gas discharge portion 225 of the cooling member 220 and moved in the front and rear direction to be discharged to the outside.

Also, the bus bar housing 276 may be configured to be coupled to the side portion 235 of the tray 230. The bus bar housing 276 may be configured to be coupled to the upper plate 240. The bus bar housing 276 may make male-female engagement with the side portion of the tray 230 and the upper plate 240. For example, the male-female engagement may have a coupling structure of a hook H2*b* and a hooking groove H1*b*.

The bus bar housing 276 may include a front sidewall 276*a*, a rear sidewall 276*b*, a left sidewall 276*c* and a right sidewall 276*d* at front, rear, left and right sides thereof, respectively. A plurality of hooking grooves H1*a*, H1*b* may be provided to each of the front sidewall 276*a*, the rear sidewall 276*b*, the left sidewall 276*c* and the right sidewall 276*d* of the bus bar housing 276. A hook H2*a* coupled with the hooking groove H1*a* may be provided to an upper end of the side portion 235 of the tray 230.

Referring to FIGS. 1 and 2 again, the upper plate 240 may be configured to cover the upper portion of the plurality of secondary batteries 100. For example, the upper plate 240 may be located at the upper portion of the bus bar housing 276. The upper plate 240 may have a plate shape extending to a size corresponding to the overall size of the plurality of secondary batteries 100 in the front and rear direction and in the left and right direction. Both left and right ends and both front and rear ends of the upper plate 240 may be bent downward. That is, the upper plate 240 may have a box shape with an open bottom. The upper plate 240 may have a hook H2*b* coupled with the hooking groove H1*b* of the bus bar housing 276.

Moreover, the front cover 250 may be configured to cover the foremost side of the plurality of secondary batteries 100. For example, the front cover 250 may have a plate shape with a size equal to or smaller than the size of the frontmost surface of two rows of the plurality of secondary batteries 100. The plate shape may be erected in the upper and lower direction.

In addition, the front cover 250 may have a structure in which the outer circumference of the plate shape is bent forward. That is, as shown in FIG. 2, the front cover 250 may have a plate shape facing the plurality of secondary batteries 100, and the outer circumference of the plate shape may have a sidewall bent to extend forward.

Further, a portion of the outer circumference (sidewall) of the front cover 250 may be coupled to the tray 230. For example, a portion of the lower sidewall 250*b* of the front cover 250 may be coupled to a front end of the support portion 231 of the tray 230. Moreover, a portion of the left sidewall 250*c* and the right sidewall 250*d* of the front cover 250 may be coupled to the side portion 235 of the tray 230. Here, the bolting method may be applied.

In addition, the rear cover 260 may be configured to cover the rearmost side of the plurality of secondary batteries 100. For example, the rear cover 260 may have a plate shape with a size equal to or smaller than the size of the rearmost surface of two rows of the plurality of secondary batteries 100. In addition, the rear cover 260 may have a structure in which the outer circumference of the plate shape is bent rearward. That is, the rear cover 250 may have a plate shape that faces the plurality of secondary batteries 100, and may have a sidewall in which the outer circumference of the plate shape is bent to extend rearward.

Also, a portion of the outer circumference (sidewall) of the rear cover 260 may be coupled to the tray 230. For example, a portion of the lower sidewall (not shown) of the rear cover 260 may be coupled to the rear end of the support portion 231 of the tray 230. Further, a portion of the left and right sidewalls (not shown) of the rear cover 260 may be coupled to the side portion 235 of the tray 230. Here, the bolting method may be applied.

Referring to FIGS. 1, 3 and 5 again, the front end 221*c* of the cooling member 220 may be coupled to the front cover 250. For example, the front end 221*c* of the cooling member 220 may be coupled to a portion of the front cover 250 by welding. In addition, the rear end 221*d* of the cooling member 220 may be coupled to the rear cover 260. For example, the rear end 221*d* of the cooling member 220 may be coupled to a portion of the rear cover 260 by welding.

Thus, according to this configuration of the present disclosure, since the cooling member 220 is coupled to the front cover 250 and the rear cover 260, the cooling member 220 may be stably fixed. In addition, since the cooling member 220 may serve as a central main shaft connecting the front cover 250 and the rear cover 260, external shocks may be absorbed or defended through their coupled structure, thereby increasing the mechanical stiffness of the battery module 200 and further improving the stability.

Referring to FIGS. 2 and 5 again, insert openings N1, N2 may be formed in a portion of the front cover 250 and the rear cover 260, respectively. Specifically, the insert openings N1, N2 may be configured such that a portion of the front end 221*c* and the rear end 221*d* of the cooling member 220 is inserted therein, respectively. For example, as shown in FIG. 5, the insert opening N1 may have a structure indented inward (toward the center) from the outer circumference of the front cover 250. The insert opening N2 may have a structure indented downward from the upper side of the rear cover 250. A lower portion of each of the front end 221*c* and the rear end 221*d* of the cooling member 220 may be inserted into each insert opening N1.

Thus, according to this configuration of the present disclosure, since the cooling member 220 is configured to be inserted into the insert openings N1, N2 formed in the front cover 250 and the rear cover 260, the cooling member 220 may be easily fixed and also easily coupled to the front cover 250 and the rear cover 260.

Moreover, the front end 221*c* and the rear end 221*d* of the cooling member 220 may be respectively inserted through the insert openings N1, N2 respectively provided in the front cover 250 and the rear cover 260 to protrude outward in the front and rear direction. That is, since the cooling member 220 is configured such that the front end 221*c* and the rear end 221*d* are exposed to the outside, it is easy to secure a coolant movement path for injecting a coolant to the cooling member 220 or discharging the coolant to the outside.

For example, as shown in FIG. 3, the coolant injection port 222 and the coolant discharge port 223 may be provided at the front end 221*c* and the rear end 221*d* of the cooling member 220, respectively. After a cooled coolant (not shown) is injected into the coolant injection port 222 and the coolant (not shown) is circulated along the coolant channel 228 provided inside the cooling member 220, the heated coolant is discharged to the outside through the coolant discharge port 223.

In addition, the bus bar housing 276 may have an insert groove 276*h* configured such that the front end 221*c* of the cooling member 220 is partially inserted therein. The insert groove 276*h* may be formed at each of the front sidewall 276*a* and the rear sidewall 276*b* of the bus bar housing 276. The insert groove 276*h* may have a form indented upward from a lower end surface of each of the front sidewall 276*a* and the rear sidewall 276*b*. That is, as shown in FIG. 5, the front end 221*c* of the cooling member 220 may be inserted and fixed into the insert groove 276*h* of the front sidewall 276*a* of the bus bar housing 276.

Thus, according to this configuration of the present disclosure, since the front end or the rear end of the cooling member 220 is inserted and fixed into the insert groove 276*h* of the bus bar housing 276, the cooling member 220 may be securely fixed to the bus bar housing, thereby effectively increasing the durability of the battery module. In addition, in the present disclosure, due to the structure in which the front end or the rear end of the cooling member 220 is exposed to the outside, it is easy to secure a space for injecting a coolant into the cooling member 220 or discharging the coolant to the outside.

Figure 7:
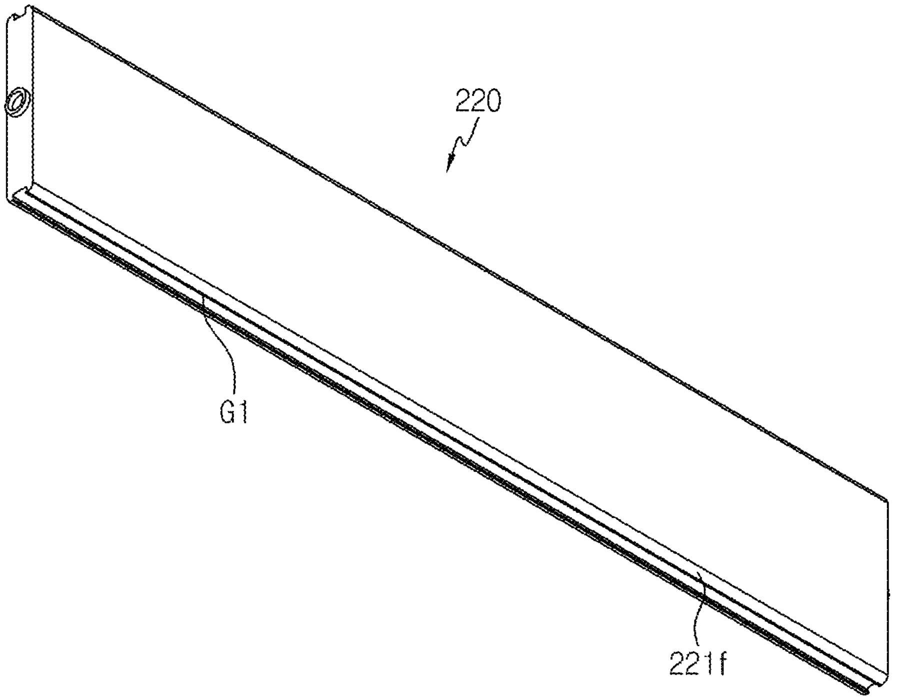
FIG. 7 is a bottom view schematically showing the cooling member, employed at the battery module according to an embodiment of the present disclosure.

FIG. 7 is a bottom view schematically showing the cooling member, employed at the battery module according to an embodiment of the present disclosure. Also, FIG. 8 is a perspective view schematically showing a tray, employed at a battery module according to another embodiment of the present disclosure.

Figure 8:
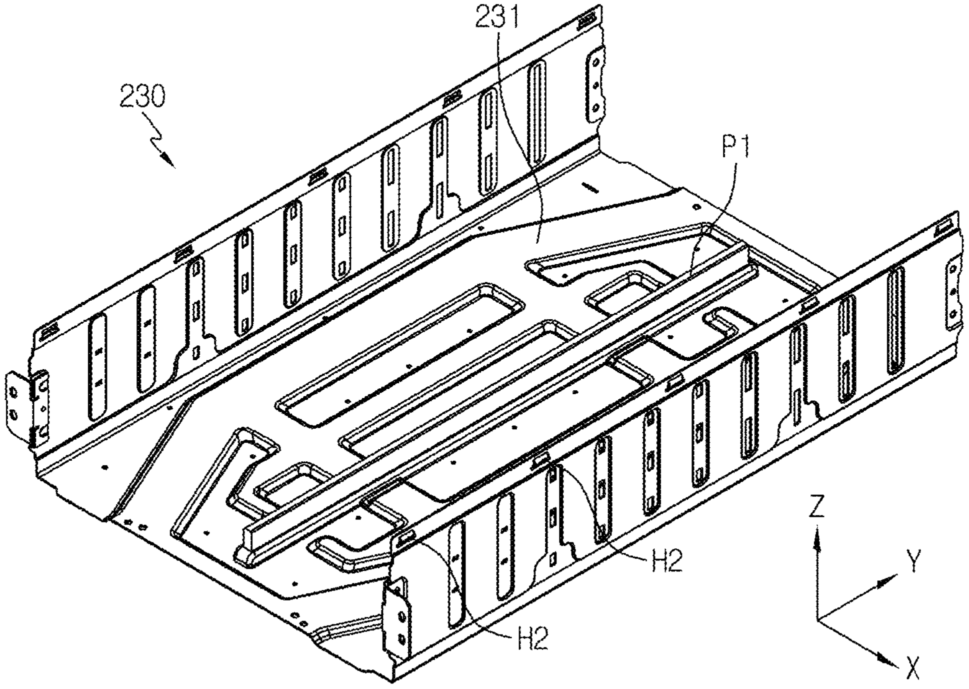
FIG. 8 is a perspective view schematically showing a tray, employed at a battery module according to another embodiment of the present disclosure.

Referring to FIGS. 7 and 8 along with FIG. 3, a fixing groove G1 configured to be coupled to the support portion 231 of the tray 230 may be provided to a lower portion 221*f* of the cooling member 220. The fixing groove G1 may be elongated from the front end 221*c* to the rear end 221*d* of the body portion 221.

Moreover, a guide protrusion P1 for coupling with the fixing groove G1 of the cooling member 220 may be provided to the support portion 231 of the tray 230. The guide protrusion P1 provided to the support portion 231 of the tray 230 may be elongated in the front and rear direction (Y direction) and have a shape protruding upward so as to be partially inserted into the fixing groove G1 of the cooling member 220. That is, the guide protrusion P1 may be fitted into the fixing groove G1 and move in a sliding movement manner.

That is, as shown in FIGS. 7 and 8, the guide protrusion P1 elongated in the front and rear direction (Y direction) may be formed at the center of the upper surface of the support portion 231 of the tray 230. The lower portion 221*f* of the cooling member 220 may have the fixing groove G1 that is indented inward and elongated in the front and rear direction. The guide protrusion P1 may be coupled to the fixing groove G1.

Thus, according to this configuration of the present disclosure, the fixing groove G1 of the cooling member 220 may be fixed to the support portion 231 of the tray 230 by being coupled with the guide protrusion P1 of the tray 230, thereby facilitating easily installation of the battery module 200. Moreover, since the cooling member 220 may act as a main shaft against external impacts in the upper and lower direction by using the coupling structure with the tray 230, it is possible to increase the mechanical rigidity of the battery module 200 further.

Meanwhile, referring to FIGS. 1 and 5 again, coupling openings 252 configured to be inserted into the fixing groove G1 may be provided to the insert openings N1, N2 respectively formed at the front cover 250 and the rear cover 260. The coupling portion 252 may have a structure protruding upward from the inside of the insert opening N1.

For example, the coupling portion 252 may have a shape protruding to a size corresponding to the indented form of the fixing groove G1 of the cooling member 220. That is, as shown in FIG. 5, the coupling portion 252 protruding upward so as to be inserted into the fixing groove G1 of the cooling member 220 may be provided to an inner lower portion of the insert opening N1 provided to the front cover 250.

Thus, according to this configuration of the present disclosure, due to the coupled structure between the fixing groove G1 of the cooling member 220 and the coupling portions 252 respectively provided to the front cover 250 and the rear cover 260, the battery module 200 may be easily manufactured, and the stability of the battery module 200 against external shocks may be increased further.

Figure 9:
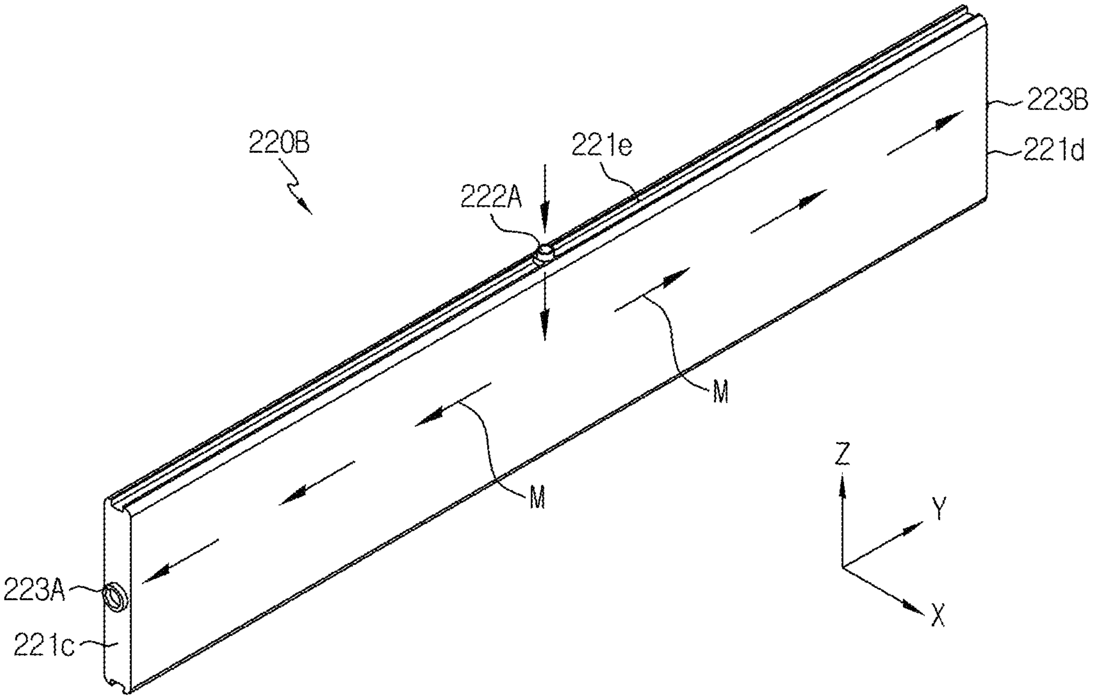
FIG. 9 is a perspective view schematically showing a cooling member, employed at the battery module according to another embodiment of the present disclosure.

FIG. 9 is a perspective view schematically showing a cooling member, employed at the battery module according to another embodiment of the present disclosure.

Referring to FIG. 9, a cooling member 220B according to another embodiment of the present disclosure may include a coolant injection port 222A provided at the center of the upper portion 221*e*. In addition, coolant discharge ports 223A, 223B may be provided at the front end 221*c* and the rear end 221*d* of the cooling member 220B, respectively. Moreover, a coolant channel (not shown) configured to allow the coolant injected into the coolant injection port 222 to move (M) in the front and rear direction (Y direction) may be provided inside the cooling member 220B.

That is, since a heat island phenomenon easily occurs at the central region of the battery module 200, the central region of the battery module 200 may always exhibit a higher temperature than the outer region of the battery module 200. Accordingly, in order to effectively control the heat balance of the battery module 200, it may be more appropriate to inject a coolant of the lowest temperature into a region (a center region) close to the center of the battery module 200 of the cooling member 220B.

Thus, according to this configuration of the present disclosure, since the cooling member 220B according to another embodiment of the present disclosure includes the coolant injection port 222A provided at the center of the upper portion 221*e* and the coolant discharge ports 223A, 223B respectively provided at the front end 221*c* and the rear end 221*d* of the cooling member 220B, it may be more effective to maintain a good thermal balance of two rows of the plurality of secondary batteries 100, compared to the cooling member 220 of FIG. 3.

Figure 10:
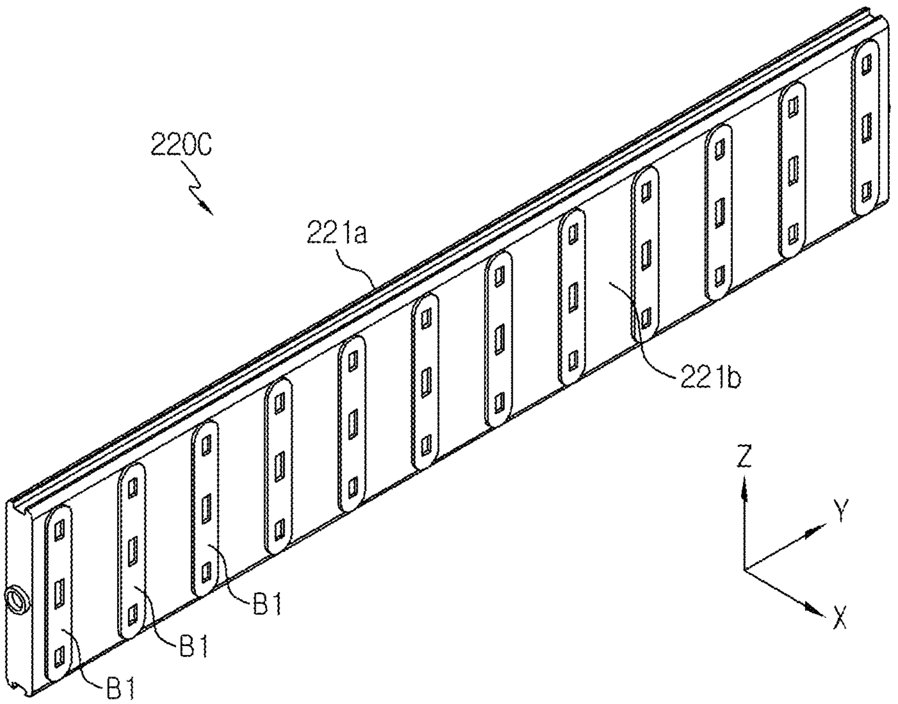
FIG. 10 is a perspective view schematically showing a cooling member, employed at a battery module according to still another embodiment of the present disclosure.

FIG. 10 is a perspective view schematically showing a cooling member, employed at a battery module according to still another embodiment of the present disclosure.

Referring to FIG. 10 along with FIG. 2, beading portions B1 raised in the left and right direction may be provided to both left and right sides 221*a*, 221*b* of a cooling member 220C according to still another embodiment. For example, as shown in FIG. 10, a plurality of beading portions B1 raised in the left direction may be provided to the left side 221*a* of the cooling member 220C. In addition, a plurality of beading portions B1 raised in the right direction may be provided to the right side 221*b* of the cooling member 220C.

Thus, according to this configuration of the present disclosure, external shocks applied to the left and right sides of the battery module 200 may be easily absorbed by the beading portions B1 of the cooling member 220C interposed between two rows of the plurality of secondary batteries 100. Accordingly, the mechanical rigidity of the battery module 200 may be greatly increased.

Meanwhile, a battery pack (not shown) according to an embodiment of the present disclosure includes at least one battery module 200. In addition, the battery pack may further include various devices (not shown) for controlling charging and discharging of the plurality of secondary batteries 100, for example a battery management system (BMS), a current sensor, and a fuse.

Meanwhile, an energy storage system according to an embodiment of the present disclosure includes the battery pack. The energy storage system may further include a control unit having a switch capable of controlling on/off operation of the battery pack.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs |
| --- |
| 200: battery module |
| 100: secondary battery |
| 220: cooling member |
| 221: body portion |
| 225: gas discharge portion |
| 230: tray |
| 231, 235: support portion, side portion |
| 240: upper plate |
| 270: bus bar assembly |
| 250: front cover |
| 260: rear cover |
| N1: insert opening |
| 221, 221A: coolant injection port |
| 223, 223A, 223B: coolant discharge port |
| G1: fixing groove |
| P1: guide protrusion |
| 252: coupling portion |
| 228: coolant channel |
| B1: beading portion |

INDUSTRIAL APPLICABILITY

The present disclosure relates to a battery module including an inner cover. In addition, the present disclosure is available for industries associated with a battery pack including at least one battery module and a vehicle including the battery pack.

What is claimed is:

1. A battery module, comprising:

a plurality of secondary batteries respectively having a gas venting portion for discharging a gas generated therein to the outside at a predetermined pressure and arranged in a front and rear direction in two rows;

a cooling member including a body portion extending in the front and rear direction interposed between the two rows of the plurality of secondary batteries and having a plurality of ends including a front end, a rear end, a top end and a bottom end, and two sides having a size corresponding to left and right sides of the plurality of secondary batteries and a coolant channel in the body portion;

a first port formed in a first end of the plurality of ends of the cooling member and a second port formed in a second end of the plurality of ends of the cooling member;

a tray including a support portion having a plate shape extending in a horizontal direction so that the plurality of secondary batteries are mounted to an upper surface thereof, and side portions extending upward from left and right ends of the support portion to cover the left and right sides of the plurality of secondary batteries;

a bus bar assembly:

an upper plate configured to cover an upper portion of the plurality of secondary batteries;

a front cover coupled to a front end of the support portion and configured to cover a foremost side of the plurality of secondary batteries; and a rear cover coupled to a rear end of the support portion and configured to cover a rearmost side of the plurality of secondary batteries, wherein the front end and the rear end of the cooling member are exposed through the front cover and the rear cover, respectively, and wherein a first end of the coolant channel is at the first port and a second end of the coolant channel is at the second port so that the coolant channel does not extend out of the cooling member.

2. The battery module according to claim 1, wherein the front end of the cooling member is coupled to the front cover, the rear end of the cooling member is coupled to the rear cover, and the bottom end of the cooling member is coupled to the support portion of the tray.

3. The battery module according to claim 2, wherein an insert opening indented inward is formed at a portion of each of the front cover and the rear cover so that a portion of each of the front end and the rear end of the cooling member is inserted therein.

4. The battery module according to claim 1, wherein the first port is a coolant injection port.

5. The battery module according to claim 2, wherein a fixing groove elongated from the front end to the rear end of the body portion is provided to a lower portion of the cooling member, a guide protrusion elongated in the front and rear direction and protruding upward so as to be partially inserted into the fixing groove of the cooling member is provided to the support portion of the tray, and a coupling portion having a protruding structure to be inserted into the fixing groove is provided to an insert opening formed at each of the front cover and the rear cover.

6. The battery module according to claim 1, wherein the first port is provided to an upper center of the cooling member, and the second port is provided at the front end of the cooling member.

7. The battery module according to claim 1, wherein beading portions raised in a left and right direction are provided to both outer sides of the cooling member in the left and right direction.

8. A battery pack, comprising at least one battery module as defined in claim 1.

9. An energy storage system, comprising the battery pack as defined in claim 8.

10. The battery module according to claim 1, wherein the cooling channel has three parallel branches, and wherein the three parallel branches diverge from each other at the front end of the cooling member and converge with each other at the rear end of the cooling member.

* * * * *